May 2, 1967  C. H. ROSS  3,316,608
INSERT FOR CASKET TOP AND METHODS OF INSERTION
Original Filed Nov. 2, 1961  11 Sheets-Sheet 1

INVENTOR.
CARL H. ROSS
BY
J. Warren Kinney, Jr.
ATTORNEY

May 2, 1967 C. H. ROSS 3,316,608
INSERT FOR CASKET TOP AND METHODS OF INSERTION
Original Filed Nov. 2, 1961 11 Sheets-Sheet 2

INVENTOR.
CARL H. ROSS
BY
*J. Warren Kinney, Jr.*
ATTORNEY

May 2, 1967   C. H. ROSS   3,316,608
INSERT FOR CASKET TOP AND METHODS OF INSERTION
Original Filed Nov. 2, 1961   11 Sheets-Sheet 3
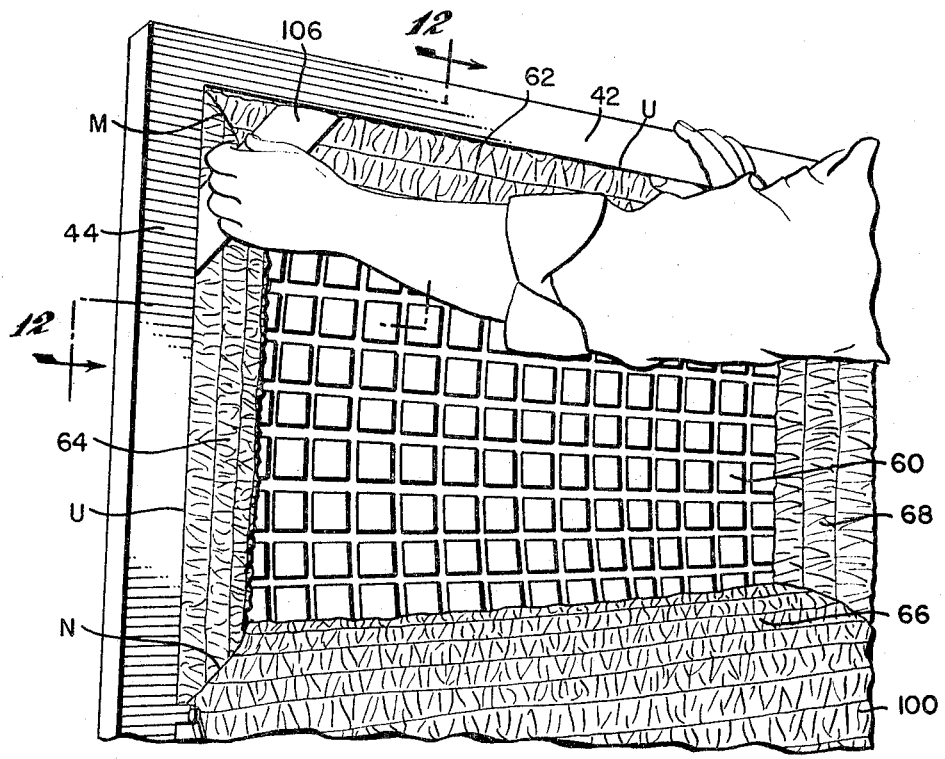
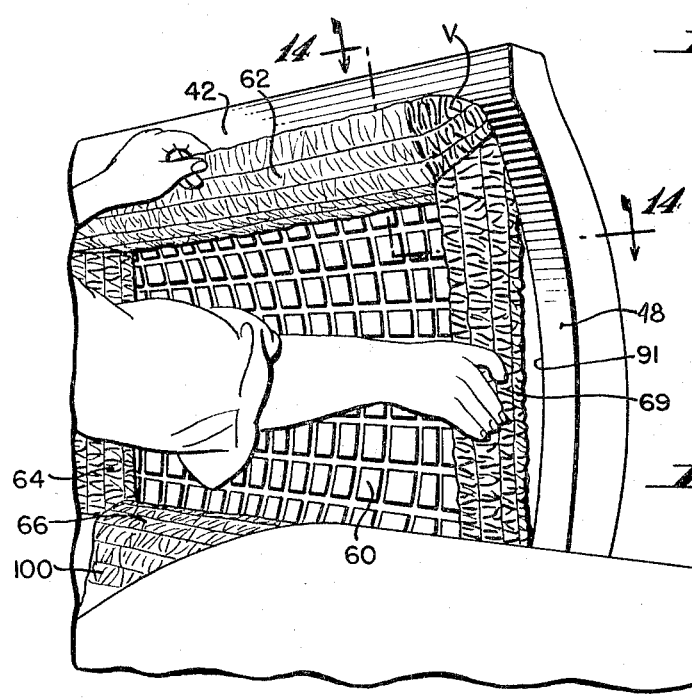
INVENTOR.
CARL H. ROSS
BY
ATTORNEY May 2, 1967  C. H. ROSS  3,316,608
INSERT FOR CASKET TOP AND METHODS OF INSERTION
Original Filed Nov. 2, 1961  11 Sheets-Sheet 4
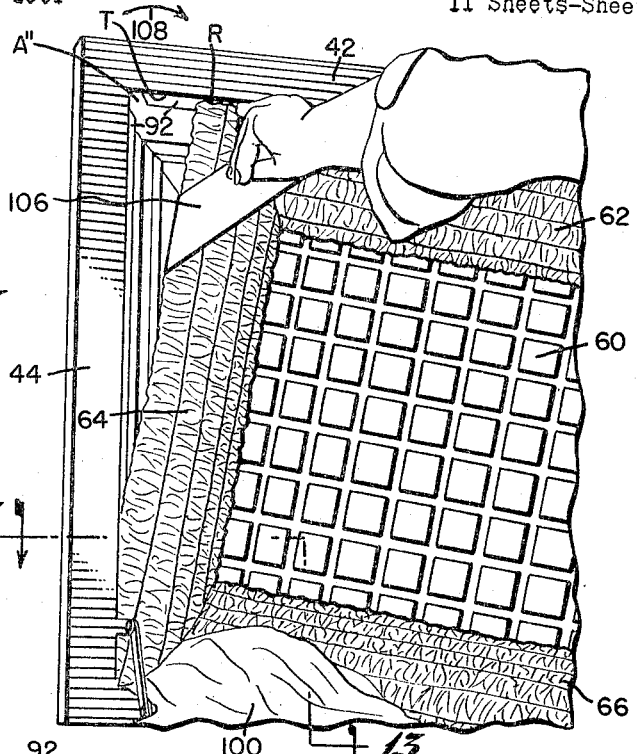
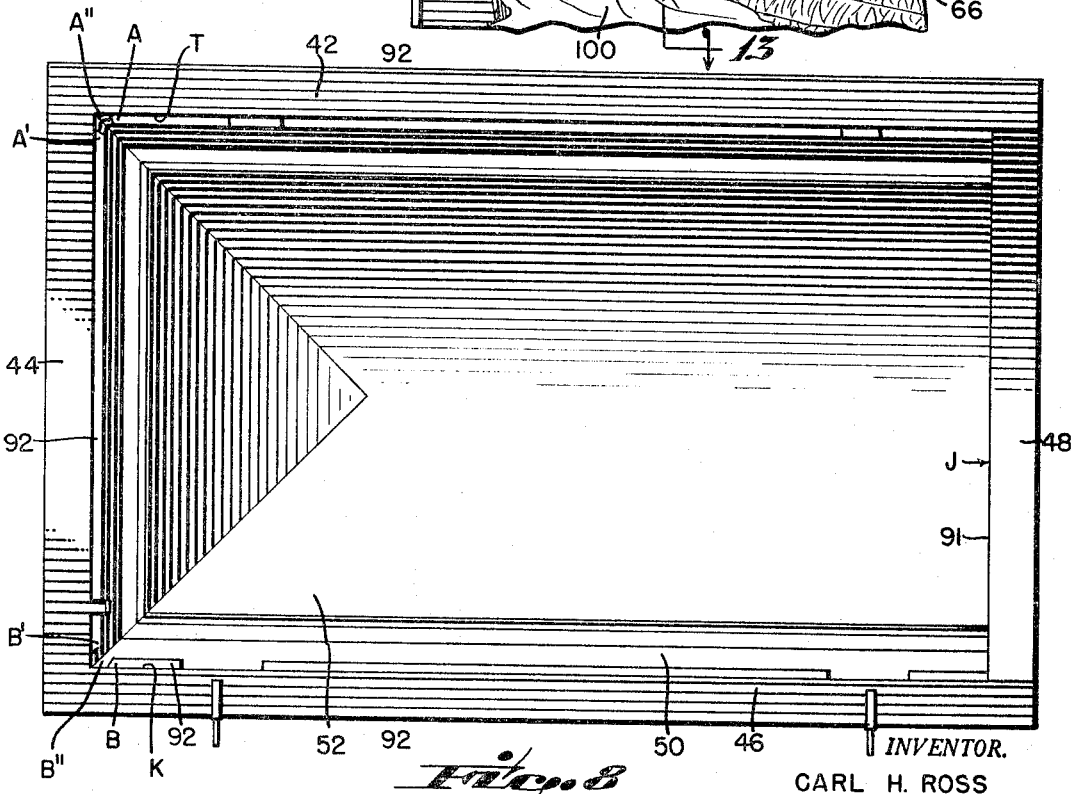
INVENTOR.
CARL H. ROSS
BY
J. Warren Kinney Jr.
ATTORNEY May 2, 1967 C. H. ROSS 3,316,608
INSERT FOR CASKET TOP AND METHODS OF INSERTION
Original Filed Nov. 2, 1961 11 Sheets-Sheet 5
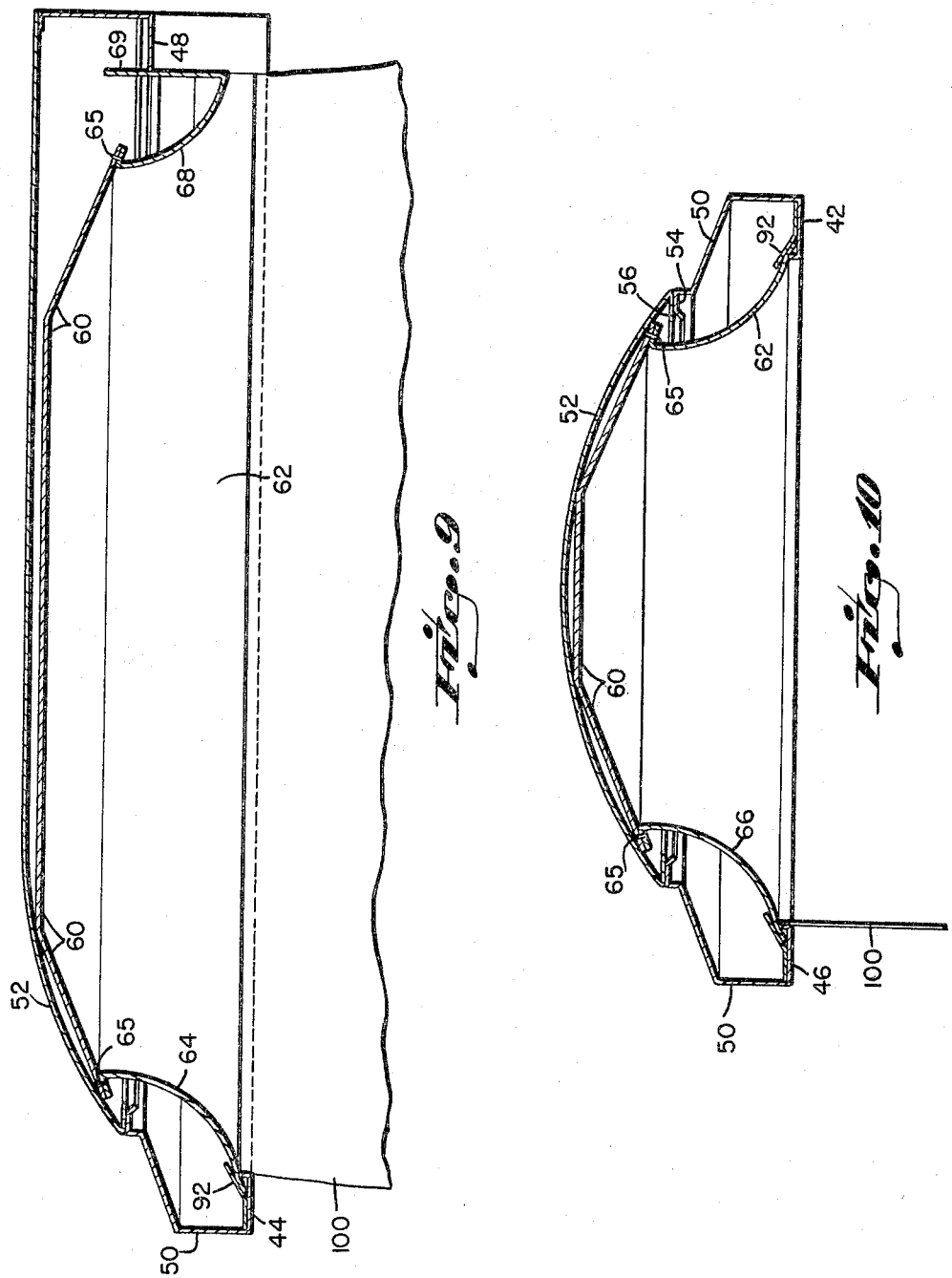
INVENTOR.
CARL H. ROSS
BY
ATTORNEY

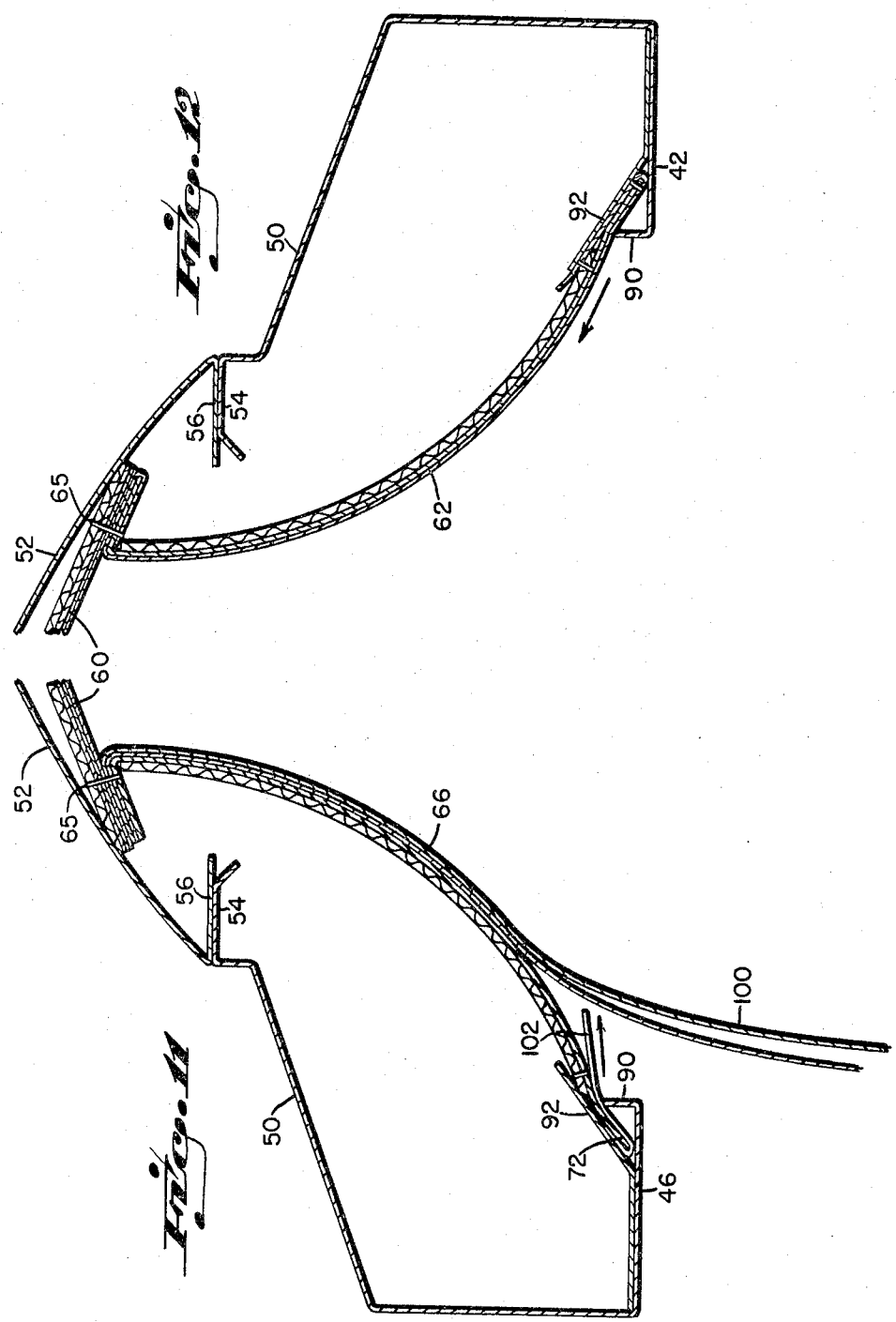

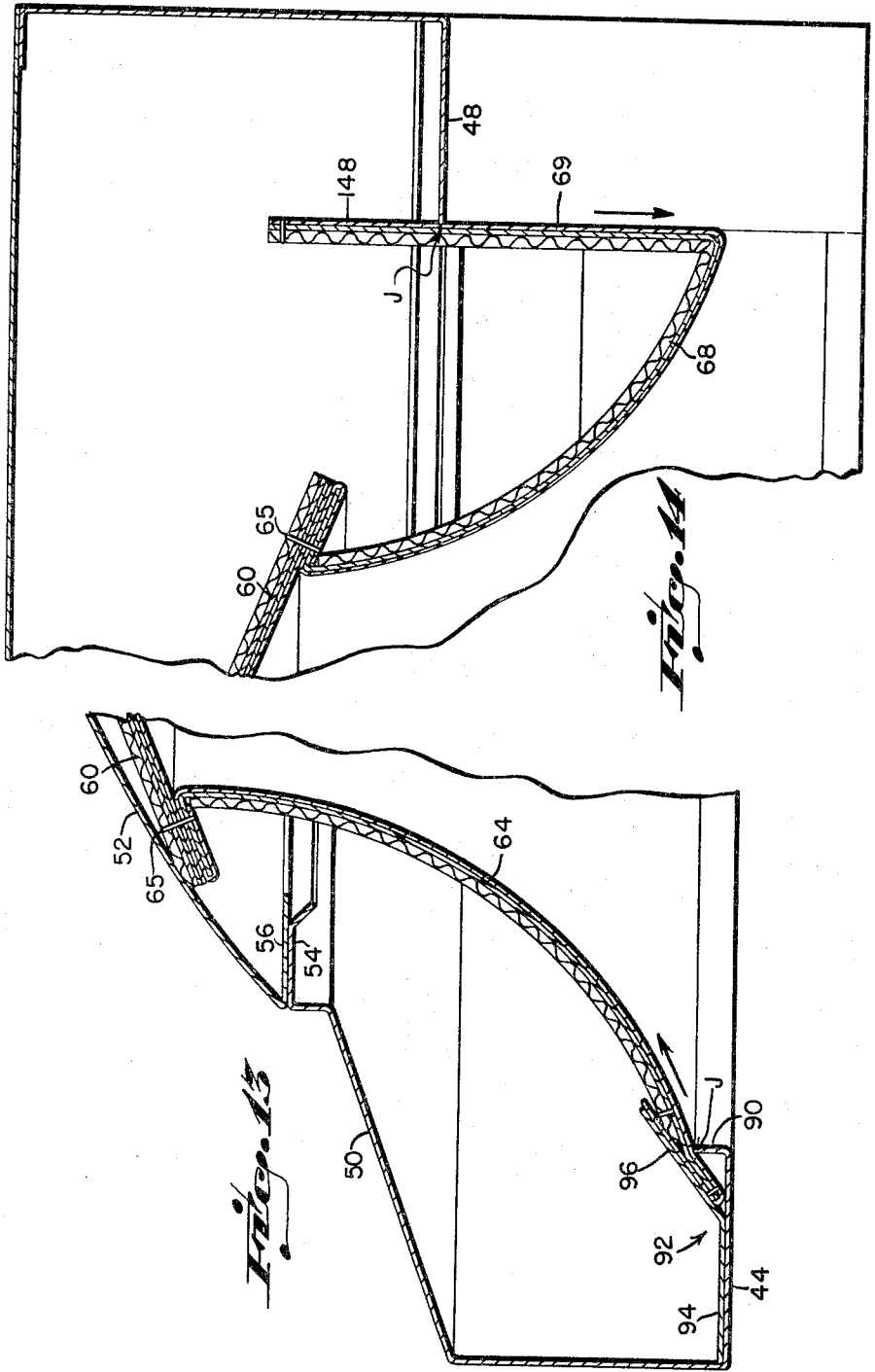

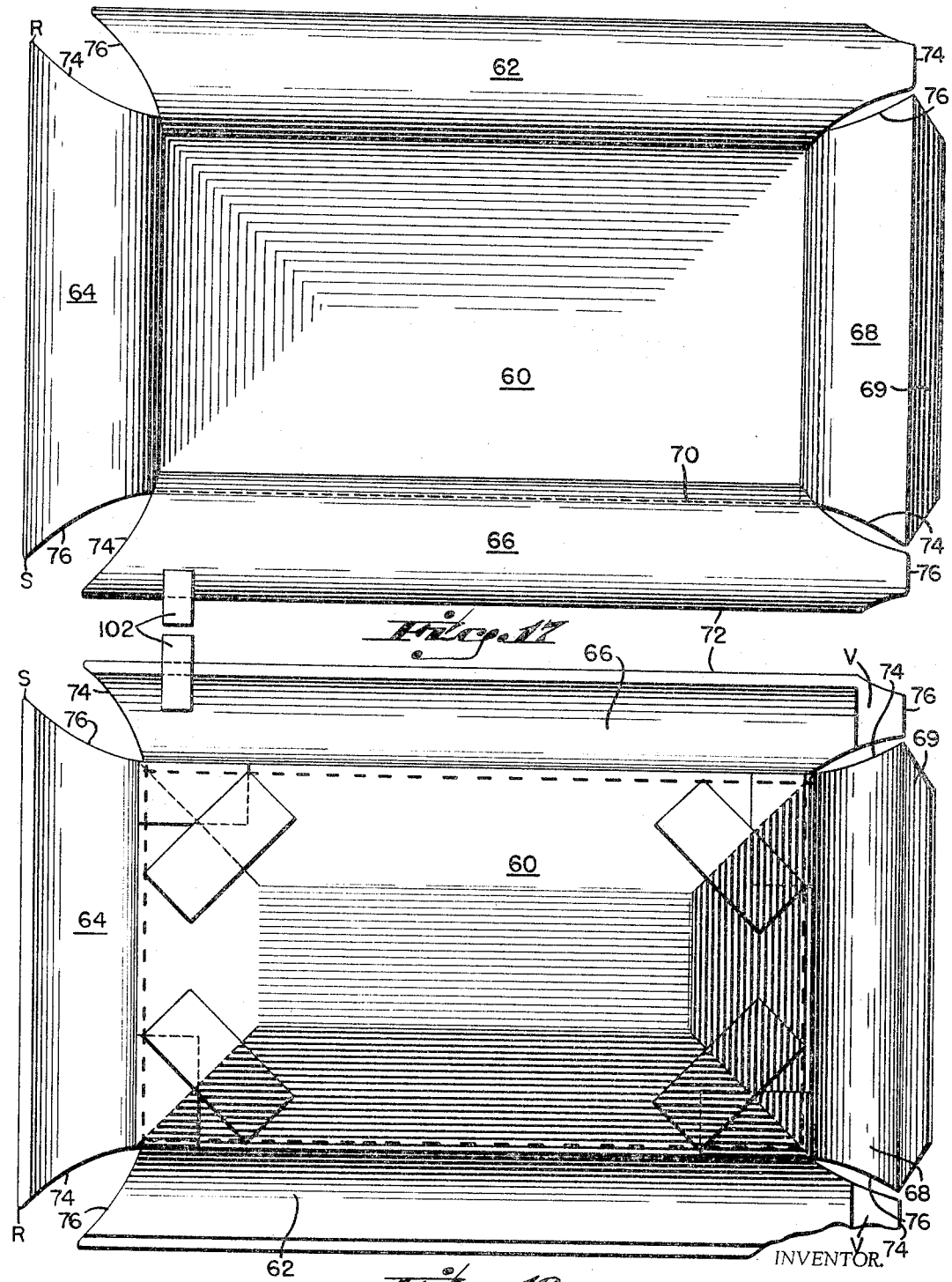

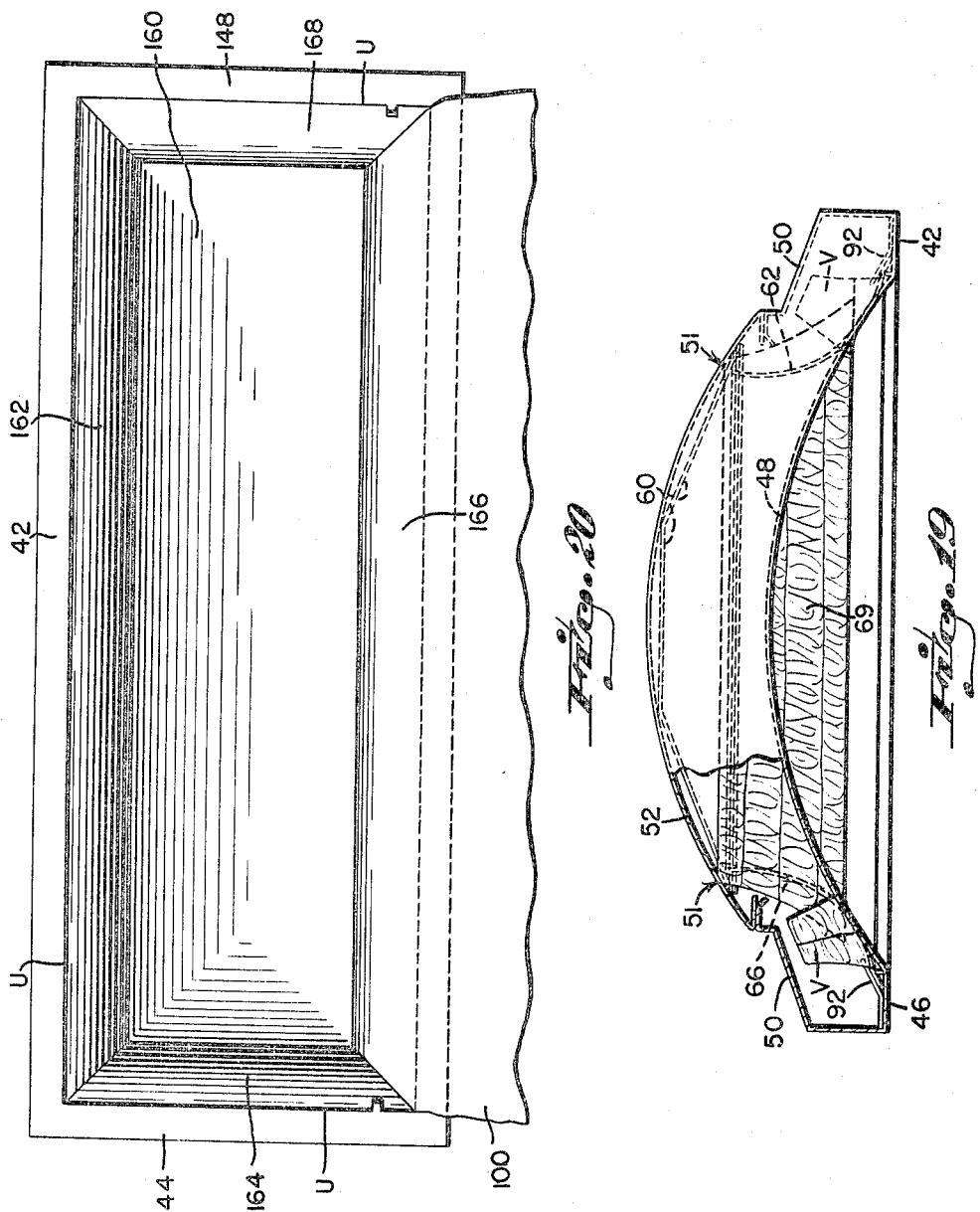

May 2, 1967 C. H. ROSS 3,316,608
INSERT FOR CASKET TOP AND METHODS OF INSERTION
Original Filed Nov. 2, 1961 11 Sheets-Sheet 11

INVENTOR.
CARL H. ROSS
BY
J. Warren Kinney Jr.
ATTORNEY

United States Patent Office 3,316,608
Patented May 2, 1967

3,316,608
INSERT FOR CASKET TOP AND METHODS
OF INSERTION
Carl H. Ross, Cincinnati, Ohio, assignor to The Crane & Breed Casket Company, Cincinnati, Ohio, a corporation of Ohio
Continuation of application Ser. No. 149,779, Nov. 2, 1961. This application June 11, 1965, Ser. No. 468,669
12 Claims. (Cl. 27—19)

The present application is a continuation of my pending application, Ser. No. 149,779, filed Nov. 2, 1961, now abandoned.

This invention relates to burial caskets, and more particularly to an upholstered liner for the top or head cap thereof.

The primary object of the present invention is to provide an upholstered insert or liner for the top or head cap of a casket, wherein the insert or liner is so constructed as to enable it to be securely though releasably anchored to the top or head cap without requiring the use of tools, and a method of insertion of liner in the top.

Another object of the invention is to provide an upholstered liner or insert which may be quickly, easily and expeditiously associated with the lid or head cap of a casket in such a manner as to enable a funeral director or jobber to interchange the upholstered inserts or liners of burial caskets. Heretofore the upholstered inserts or liners were fixedly secured to the lid or head cap portion of a casket by means of tacking, adhesives or the like by the manufacturer in such a manner as to preclude the removal or interchange of such liners except by the manufacturer—and then at considerable expense requiring the use of skilled upholsterers.

A further object of the invention is to provide a liner construction, having the foregoing characteristics, which may be quickly associated with and/or removed from the lid or head cap of a casket by unskilled help, and wherein the use of sealing strips, gimps and the like may be dispensed with while obtaining an attractive, finished appearance at the juncture of the insert or liner with the adjacent portions of the peripheral rim of the lid or head cap.

A further object of the invention is to provide an upholstered insert for the lid or head cap of a casket, wherein the insert comprises a central panel dimensioned to be received within the cap of the lid, and which insert includes peripheral side edge panels which are hingedly secured to and carried by an edge of the central panel, said peripheral panels having free outer edges which are adapted to engage portions of the peripheral rim of the lid for transversely bowing said edge panels and placing them in tension for yieldably urging the central panel into engagement with the cap.

These and other objects are attained by the means described herein and as disclosed in the accompanying drawings, in which:

FIGS. 3, 4, 5, 6 and 7 are perspective views illustrating the steps to be followed in removing the upholstered liner or insert from the head cap of FIG. 1.

FIG. 8 is a plan view of the interior of the head cap of FIG. 1 with the liner completely removed therefrom.

FIG. 9 is a sectional, schematic view taken on line 9—9 of FIG. 1.

FIG. 10 is a sectional, schematic view taken on line 10—10 of FIG. 1.

FIG. 11 is a sectional view taken on line 11—11 of FIG. 3.

FIG. 12 is a sectional view taken on line 12—12 of FIG. 5.

FIG. 13 is a view taken on line 13—13 of FIG. 7.

FIG. 14 is a sectional view taken on line 14—14 of FIG. 6.

FIG. 17 is a view, similar to FIG. 15, showing the central and edge panels, without upholstery.

FIG. 18 is a view of the opposite side of FIG. 17.

FIG. 19 is a view of the right or arch-end of the head cap of FIG. 1, with parts thereof being broken away for clarity of detail and understanding.

FIG. 20 is a plan view of the lid of a full-couch type burial casket embodying the teachings of the present invention.

Figure 1:
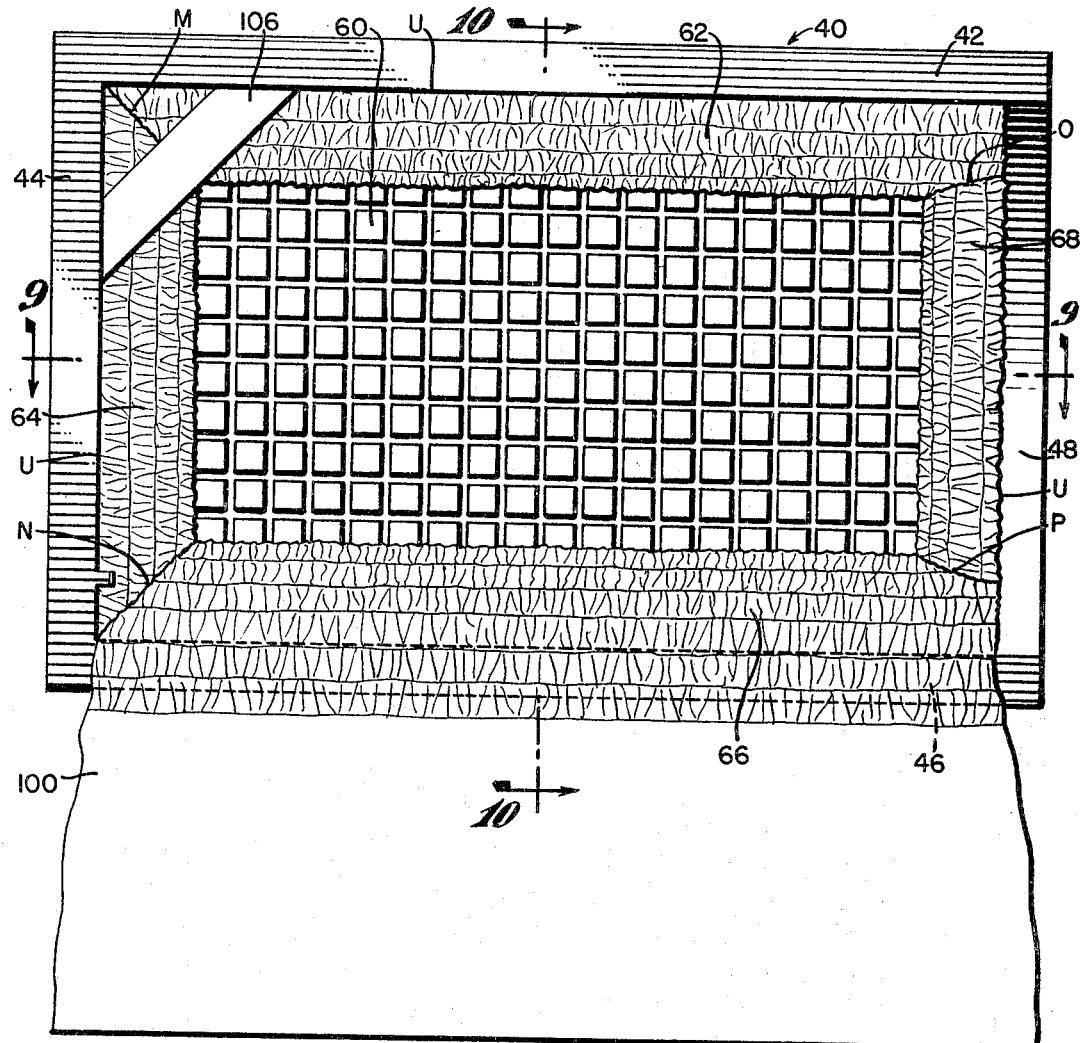
FIG. 1 is a front view of the head cap of a casket, in fully opened position, embodying the teachings of the present invention.
Figure 2:
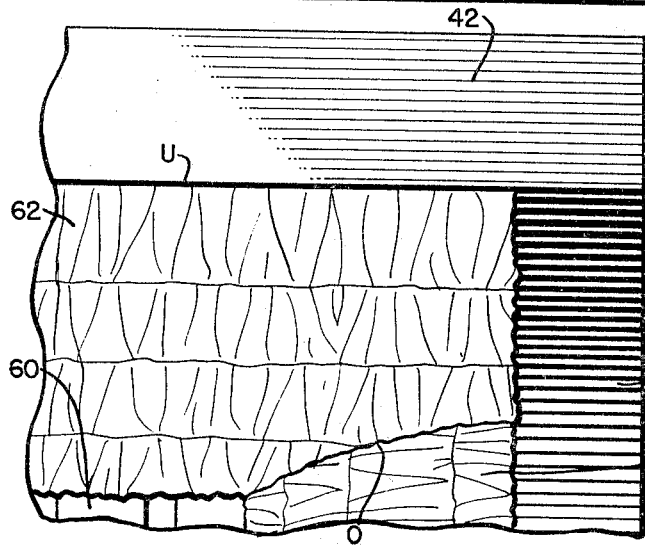
FIG. 2 is an enlarged view of the upper right corner of FIG. 1 for illustrating a detail of construction.

With particular reference now to FIG. 1, the numeral 40 denotes generally the head cap of the lid of a half-couch burial casket as it appears when fully opened.

The numerals 42, 44, 46 and 48 denote top, head, hinge and arch flanges, each of which, as best illustrated in FIGS. 9 and 10, is disposed in a horizontal position when the cap is closed; said flanges, in the preferred embodiment of the invention, being formed integral with the peripheral rim 50 which depends from an elevated central portion, or cap 52. The present invention is neither concerned with nor directed to the particular manner in which the head cap is fabricated, however, solely by way of example, and not by way of restriction, the peripheral rim 50 may include an upper, inturned welding flange 54 which is permanently affixed to an inturned welding flange 56 of the elevated central portion 52.

The aforesaid flanges terminate in free peripheral edges J and in the preferred embodiment of the invention the top, head and hinge flanges are provided with integral upstanding lips 90.

As earlier indicated, a principal and primary object of this invention is to provide a method of and means for securely though releasably anchoring a preformed upholstered insert to the interior of a head cap, without requiring tacking, the use of tools, and wherein the need for grimps and other peripheral sealing members has been completely eliminated.

With reference again to FIG. 1, the numeral 60 denotes generally the central panel of the insert which, as best illustrated in FIGS. 9 and 10, is dimensioned whereby to be received within the elevated central portion 52 of the cap. The numerals 62, 64, 66 and 68 denoted, respectively, the top roll, head roll, hinge roll and arch roll portions of the upholstered insert, said top, head, hinge and arch rolls being also referred to as peripheral panels.

With particular reference now to FIGS. 9 and 10, it will be noted that the various top, head, hinge and arch rolls or panels 62, 64, 66 and 68 are individually and hingedly secured to the side and end edges of the central panel such as, by means of stapling, stitching, or the like, denoted by the numeral 65, whereby each of said peripheral panels is adapted for relative movement with the other peripheral panels and with the central panel 60.

As best illustrated in FIGS. 17 and 18, it will be noted that each of the peripheral panels 62, 64, 66 and 68 includes inner edges 70, outer edges 72 and free outer ends 74 and 76, it being understood that the inner ends are secured to the central panel 60 for hingedly mounting their respective panels to the center panel.

The central panel 60 and each of the peripheral panels 62, 64, 66 and 68 are covered with fabric whereby to provide an attractive appearance. The upholstery material may be applied to and turned under the outer edges 72 of the peripheral panels to which it may be anchored by means of stitching or stapling as at 80.

As illustrated in FIGS. 11–14, each of the top, head and hinge flanges 42, 44 and 46 terminates in an upturned lip 90. A backing strip denoted generally by the numeral 92 and comprising a mounting leg 94 which abuts and is fixedly secured to flanges 42, 44 and 46 by welding, or the like, includes a free, upturned leg 96 which is inclined inwardly of the flange and outwardly whereby to extend over and project beyond the free end J of lip 90. As best illustratrated in FIG. 8, the backing strips 92 are discontinuous, and terminate at A, A′ and B and B′ for providing an open, unobstructed pair of corner throats A″ and B″, respectively. The inner edge 91 of the arch flange 48 is not provided with an upturned lip; however, if desired, such an upturned lip could be provided.

With reference to FIGS. 15–18, the overall length of the outer edge of the head roll or peripheral panel 64, between points R and S, is of a dimension which exceeds, by one-quarter or more of an inch, the lateral spacing between the adjacent faces T and K of lips 90 of the top and hinge flanges 42 and 46 of the head cap, whereby ends R and S of the head roll or peripheral panel 64 will extend or project beyond lips 90 of the top and hinge flanges 42 and 46, for thereby securely though releasably anchoring the head roll or peripheral flange 64 relative to the head cap.

In FIGS. 1 and 3 to 7, inclusive, I have illustrated the manner in which an upholstered insert is removed from the head cap, and, as will hereinafter become more clearly apparent, the steps utilized in removing an upholstered insert are the reversal of the various steps to be followed in inserting an upholstered insert.

Figure 3:
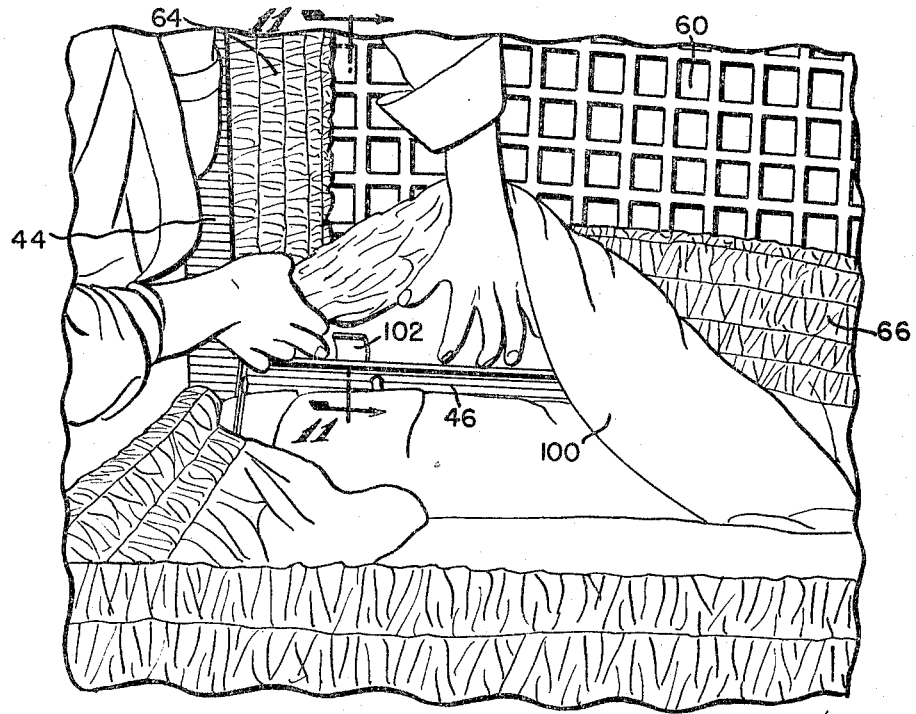
Figure 4:
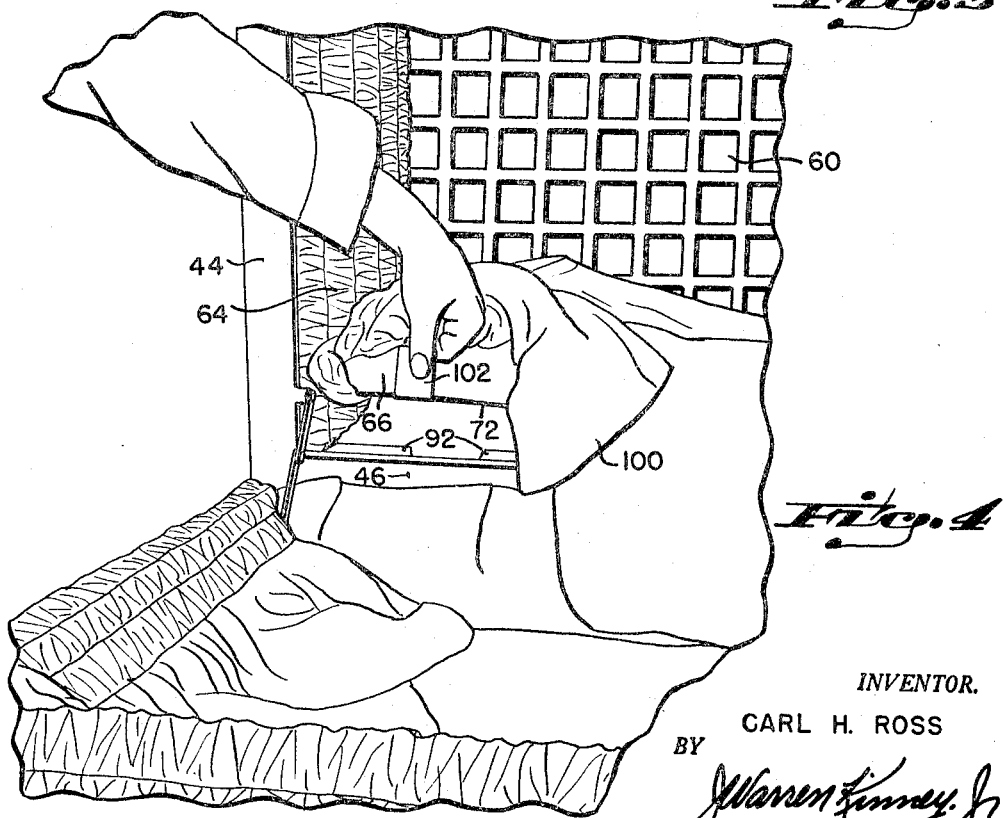
Figure 15:
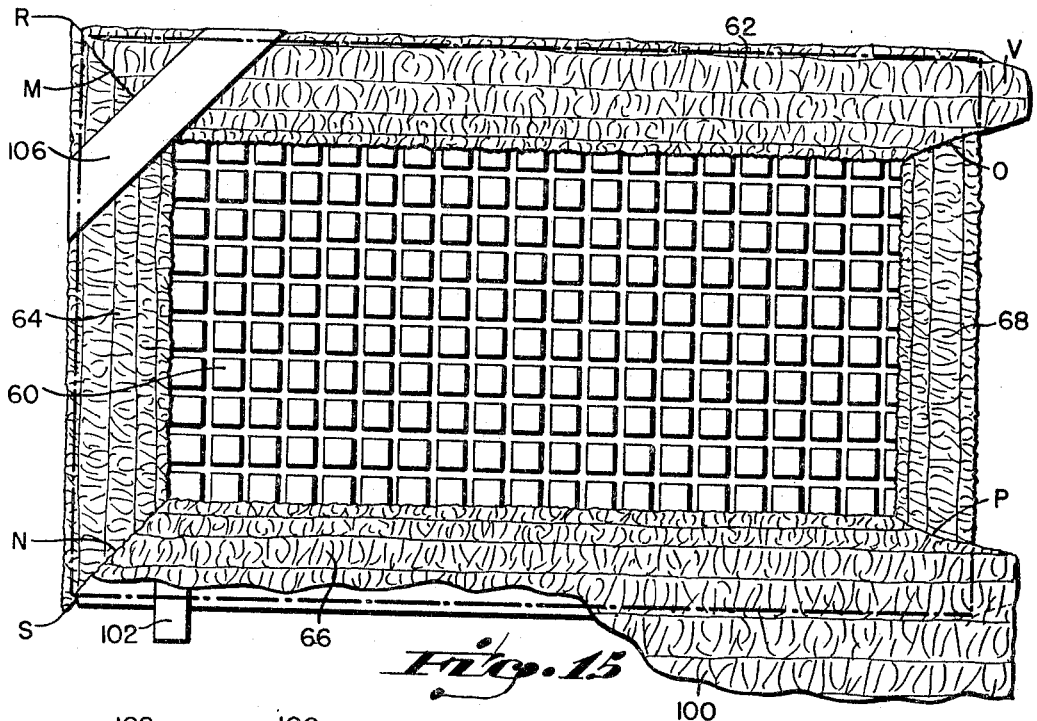
FIG. 15 is a plan view of the finished, or upholstered, side of the insert, per se.
Figure 16:
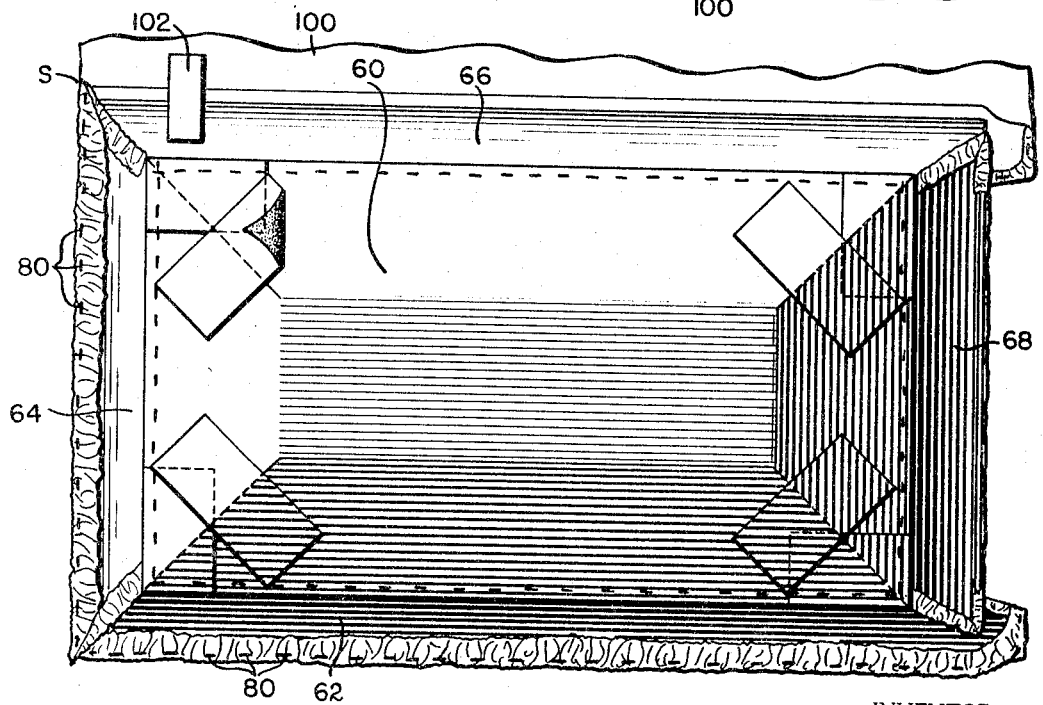
FIG. 16 is a view similar to FIG. 15, showing the opposite side of the upholstered insert of FIG. 15.

The numeral 100, FIGS. 1, 3 and 4, denotes generally a hinge cover of fabric, or the like, which, in the preferred embodiment of the invention is secured to or integral with the upholstered portion of the hinge roll or peripheral panel 66, said hinge cover concealing the connection between the head cap 40 and the rear edge of a casket body to which it is hingedly connected.

In order to remove the upholstered insert, the hinge cover 100 is lifted, note FIG. 3, adjacent the head end of the hinge roll 66 for thereby exposing a pull tab 102 which is suitably secured to and carried by the outer, head-adjacent portion of the hinge roll or peripheral hinge panel. Application of a lifting force to tab 102 will, as best illustrated in FIGS. 11 and 4, enable the operator to disassociate the outer edge 72 of the hinge roll or peripheral panel 66 from engagement with the hinge flange 46.

As illustrated in FIG. 4, lifting of tab 102 not only effects removal of outer edge 72 of the panel from the backing strips 92, but it also results in said panel being hinged upwardly relative to central panel 60, whereby the outer head-end of said panel is shifted upwardly relative to the hinge-adjacent end of the head roll or peripheral panel 64.

After the hinge roll has thus been disengaged from the hinge flange of the casket rim, the top roll or peripheral flange 62 may next be dislodged by reason of an operator applying a downward force to the head-end thereof, such as, by way of example, to an ornamental ribbon 106 which is suitably secured to and passes over the outer edge of panel 62. In this manner the free outer edge of the top roll or peripheral panel 62 will be disengaged from the top rim flange 42 of the head cap.

After the top and hinge rolls have thus been disengaged from their respective top and hinge flanges of the head cap rim, the arch roll or peripheral panel 68 may then be grasped and pulled outwardly relative to edge 91 of the arch flange of the head cap rim.

After the top, hinge and arch rolls have thus been freed from contact with their respective head, hinge and arch flanges, the head roll or peripheral panel 64 may be released as illustrated in FIG. 7, wherein it will be noted that the upper end thereof is swung outwardly as indicated by the headed numeral 108 for dislodging upper end R of the head roll from beneath edge T of inturned lip 90 of the top flange and for thereby withdrawing corner R from upper throat A″. After an end of the head roll has thus been freed, the lower end thereof may be removed as the insert is then bodily lifted from the head cap.

After the upholstered insert has thus been removed from the head cap, it may be quickly and easily replaced, or it may be replaced by another insert in the following manner: First one or the other of ends R or S of the head roll or peripheral panel 64 is associated with the backing strip of the head flange of the rim lid with ends R and S projecting beyond the adjacent edges T and K of the top and hinge flanges 42 and 46 of the rim.

Next the arch roll 68 is associated relative to the arch flange and arch wing 69 turned toward the central dome-shaped portion 52 of the lid whereby to engage edge 91 and be disposed at substantial right angles with arch flange 48 of the rim. As best illustrated in FIG. 19, the outer ends of arch wing 69 are adapted to abuttingly engage the interior of the central dome-shaped portion 52 as at 51, thereby providing a positive stop for the arch wing 69.

After the head roll and arch rolls have thus been completely associated with their respective rim flanges, the top and hinge rolls may then be associated with their respective flanges of the lid rim. It is immaterial whether the top roll or hinge roll is next associated with the head cap, however, it will be noted that as the outer edges 72 of the top and hinge rolls are in the process of being associated with their respective backing strips, the head-adjacent outer ends of the top and hinge rolls will overlappingly engage the end-adjacent portions of the head roll whereby to provide neat, finished, mitered corners M and N having an attractive appearance which is indistinguishable, even to the trained eye of an upholsterer, from the mitered edge of a permanently secured, custom-upholstered casket-interior of the prior art.

By the same token, the arch-adjacent ends V of each of the top and hinge rolls will overlappingly engage the end-adjacent portions of the arch roll whereby to provide a neat, finished, mitered corner construction at O and P.

As clearly evident from FIGS. 9–13, the central panel 60 of the upholstered insert is received within and will be securely urged into contacting relationship with the underside of cap portion 52 by the resilient action of the top, head and hinge rolls or peripheral panels 62, 64 and 66.

In FIG. 20, I have illustrated the lid of a full couch type of burial casket. In this lid construction the numeral 148 denotes a foot flange which is the complement of head flange 44, in all respects. The upholstered insert panel includes a central portion 160, top, head, hinge and foot rolls 162, 164, 166 and 168, respectively, however, the foot roll 168 is a substantial duplicate of the head roll 164, but shorter. It will, of course, be understood that in this construction a backing strip 92 will be provided along and in association with the upturned lip of foot flange 148 of the lid. When inserting the upholstered interior, the head adjacent ends of the top and hinge rolls 162 and 166 overlappingly engage the end-adjacent portions of the head roll 164; however, the top and hinge adjacent ends of the foot roll 168 overlappingly engage the foot-adjacent portions of the top and hinge rolls 162 and 166, since the foot roll is associated with its backing strip as the final step of associating the upholstered liner with the interior of the lid.

In passing, it will be noted that the end edges R and S of the head roll 164 are similar to the construction illustrated in FIGS. 15–18, however, the free outer ends of the foot roll 168 are of a dimension approximating the lateral spacing between lips 90 of the top and hinge flanges of the lid of FIG. 20.

Casket lids constructed in accordance with the teachings of this invention have been commercially produced and the interiors thereof have been removed, and replaced by other upholstered inserts, by the average, untrained funeral directors in less than five minutes.

Another important feature of my invention is the manner in which the free peripheral edges of the flanges 42, 44, 46, and 48 are disposed in positive abutting relationship with the outer face of their respective peripheral panels 62, 64, 66 and 68. The resultant juncture U between the insert and lid is so perfect, effective and attractive as to render unnecessary the use of fillers, beadings, liner strips, gimps, or the like which have hitherto been used to conceal the juncture between the adjacent portions of casket lids and the liners thereof.

The relationship between the means by which the outer ends of the peripheral panels are associated with the inner face of their respective casket-top flanges is such as to maintain the outer face of said panels under tension against the free outer edge of said flanges.

When the outer edges of the peripheral panels are associated with their respective flanges, said panels, being of flexible material, will be placed under tension and in transversely bowed configuration for resiliently maintaining portions of center panel 60 in abutting relationship with the interior of the central cap of the casket top, as clearly illustrated in FIGS. 9–13.

With further reference to FIGS. 9–13, it will be noted that the upturned or terminal leg of the backing strip 92 performs the three-fold function of:

(a) guiding the outer edge of a peripheral panel into abutting relationship with the corresponding flange of the casket top;

(b) backing up or reinforcing the edge-adjacent portion of the peripheral panel whereby to preclude relative movement of the outer edge of the panel rearwardly into the interior of the rim 50;

(c) and for urging the outer face of the panel into positive contacting relationship with the free outer edge J of the rim flange.

It will be noted that the relationship of the backing strip and flanges is such as to permit the outer edge of a peripheral panel to be easily inserted into the throat defined by the spacing between the adjacent surfaces of the backing strip 92 and peripheral edge of a corresponding flange incident to flexing or bowing the intermediate portion of a panel for positioning its outer edge so as to pass over the peripheral edge of the flange and thence into abutting relationship with portions of the flange.

It will likewise be noted that once the outer edge of a peripheral panel has been positioned as illustrated, by way of example, in FIGS. 9–13, the inherent resiliency of said panel is such as to positively preclude the accidental or unintentional dislodgment or removal of said panel from its relationship with portions of the casket top; however, when it is desired to remove said panel, the edges thereof may be disengaged from association with their respective flanges by merely applying a force to the panel which will withdraw the edge from its nested position with the backing strip and flange.

In other words, the free outer edges of peripheral panels may be literally "snapped" into abutting relationship with the flanges of the casket top for securely though releasably mounting the removable insert relative to the interior of the casket top.

In FIGS. 21–24 I have illustrated various modifications with which the peripheral flanges of the lid or head-cap of a casket may be provided.

Figure 21:
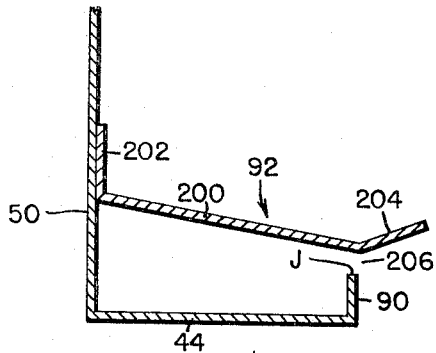
FIGS. 21, 22, 23 and 24 are sectional views illustrating modifications in the structural details of the peripheral flange of the lid or head cap of the casket.

In FIG. 21 the numeral 92 denotes generally a backing strip which includes an intermediate leg 200, one end of which terminates in a mounting leg 202 fixedly secured to rim portion 50 of the casket top, and a terminal leg 204, which projects outwardly beyond and upwardly from peripheral edge J of upturned lip 90 of flange 44 for thereby defining throat 206 into which the outer edge of a peripheral panel may be received in such a manner that edge J will firmly abut the outer face of the panel and wherein terminal leg 204 will abuttingly engage and reinforce the rear face of the panel immediately beyond and outwardly of the peripheral edge of the flange.

Figure 22:
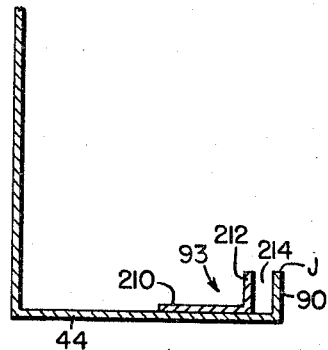

In FIG. 22 the backing strip 93 comprises a mounting leg 210 which is anchored to flange 44, and an upstanding backing leg 212 mounted in substantial spaced parallelism with upstanding rim 90 of flange 44 for providing a throat 214.

When the outer edge of a peripheral panel has been snapped downwardly through throat 214 into the space between elements 212 and 90 for positioning its outer edge in abutting relationship with flange 44, peripheral edge J will be disposed in tight abutting relationship with the outer face of the panel.

Figure 23:
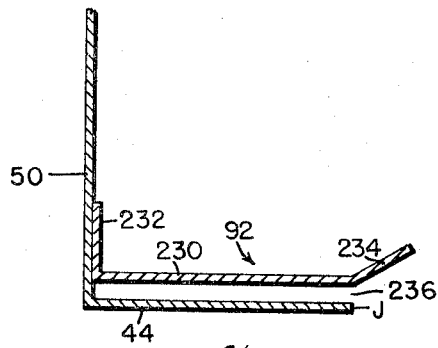

In FIG. 23 backing strip 92 includes an intermediate leg 230 disposed in substantial spaced parallelism with flange 44 of rim 50 of the casket top. Mounting leg 232 is securely anchored to the inner face of rim 50 for disposing terminal leg 234 in an upwardly and outwardly inclined relationship with peripheral edge J of flange 44 for defining throat 236.

In this modification the spacing between the adjacent faces of intermediate leg 230 and flange 44 is of a dimension substantially equal to the overall thickness of the end-adjacent portions of the outer edges of the peripheral panels. When the edge of a peripheral panel has been introduced through throat 236 and seated within the channel-way provided by the backing strip, outer edge J of flange 44 will snugly and abuttingly engage the outer face of the panel and terminal leg 234 will reinforce said panel immediately outwardly of edge J of flange 44.

Figure 24:
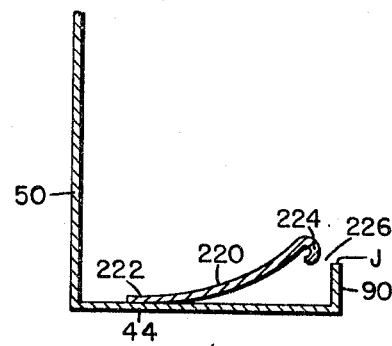

In FIG. 24 I have illustrated a spring type backing strip which includes an intermediate portion 220 permanently anchored as at 222 to flange 44. The terminal end 224 of the backing strip may be turned upon itself, as indicated, for defining a throat 226 with terminal edge J of upstanding lip 90 of flange 44.

In the midification illustrated in FIGS. 22 and 24, the outer edge J of lip 90 will be disposed in abutting relationship with the outer face of the panel; however, in these two modifications the inner faces of said panels are not reinforced as is the case with the construction illustrated in FIGS. 9–13, 21 and 23.

Regardless of the particular type of backing strip used, it will be noted that the purpose thereof is to cooperate with the particular rim flange with which it is associated for defining an elongate pocket which opens upwardly along an elongated throat, and wherein the flange constitutes the bottom of the pocket.

Figure 25:
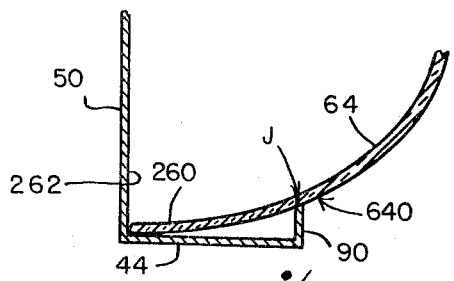
FIGS. 25 and 26 are sectional views illustrating other modifications in the structural details of the peripheral flange of the lid of a casket.

In FIG. 25, it will be noted that the outer edge 260 of a peripheral flange such as 64 has been flexed whereby to pass over and abuttingly engage the outer peripheral edge J of upturned lip 90 of the inturned flange 44 of rim 50 whereby to abuttingly engage inner wall 262 of rim 50, as illustrated. It will be noted that the inherent resiliency of the peripheral panel is such as to maintain it, under tension, for resiliently maintaining a central panel such as 60 in contacting relationship with the interior of cap 50, as in FIG. 13; however, in the modification illustrated in FIG. 25, I have dispensed with backing strip 92 without, however, sacrificing the essential features of the invention.

Figure 26:
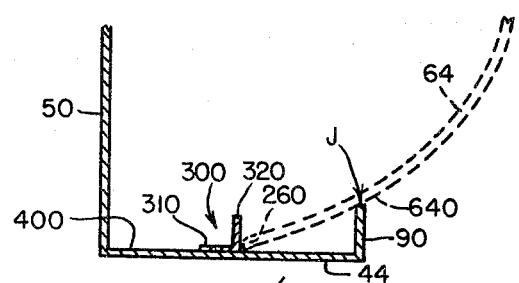

In FIG. 26 the numeral 300 denotes an interior abutment member having a mounting leg 310 welded or otherwise permanently secured to the inner face 400 of flange 44 for disposing the upstanding terminal leg 320 in laterally spaced relationship with respect to upturned rim 90. The iner end 260 of peripheral panel 64 is adapted to abuttingly engage terminal leg 320 and inner face 400 for positioning the panel in a transversely bowed condition under tension and with the outer surface 640 thereof in contact with peripheral edge J of lip 90.

In the preferred embodiment of the invention, those ends of the top and hinge peripheral panels 62 and 66 remote from the head end are provided with an outturned tab V which, as best illustrated in FIGS. 6 and 19, are adapted to be disposed at substantial right angles with the longitudinal axis of their respective panels for providing a finished end adjacent the arch flange 48 of the casket top.

I claim:

1. A casket top having internally extending flanges on opposite sides and opposite ends thereof, which opposite side flanges and at least one end flange are in a horizontal position when the top is closed on a casket body and which opposite side flanges terminate in an upwardly extending lip having a free peripheral edge, and a relatively wide flat backing strip secured to the top of each of said opposite side flanges and to the said one end flange, said strips each including a terminal end projecting in spaced relationship with and above and across and beyond the said peripheral edge of the adjacent lip toward the casket top and defining with the adjacent lip edge the throat of an elongate pocket opening upwardly of and bottomed by the adjacent flange.

2. A casket top having internally extending flanges on opposite sides and opposite ends which are in horizontal position when the top is closed on a casket body and each of which opposite flanges terminates in an upturned lip having a free upwardly directed peripheral edge, a relatively wide flat backing strip secured to each of said opposite flanges, each strip including a terminal end projecting in spaced relationship above, beyond and across the peripheral edge of the adjacent lip toward the casket top and defining with the adjacent lip the throat of an elongate pocket bottomed by the adjacent flange, and an ornamental insert provided with peripheral panels having straight, flat outer side portions having outer edges, said edges and said outer side portions each being received in a throat of a pocket and said edges each abutting the bottom of the pocket with the terminal ends of the backing strip reinforcing the edge-adjacent inner side portions of the panels, and with the peripheral edge of each flange lip abutting the outer face of said outer side portion of the adjacent panel.

3. A readily insertable and removable liner insert for the top of a burial casket of the type that includes a central cap and an integral depending peripheral rim provided with inwardly extending flanges which terminate in upstanding lips which define a free peripheral edge, each flange having an upper inside face which is in horizontal position when the top is closed, a backing strip secured to the upper inside face of said flanges, said backing strips each including a terminal end projecting in spaced relationship with and above and across and beyond the said peripheral edge of an adjacent lip toward the casket top and defining with an adjacent lip the throat of an elongate pocket opening inwardly and upwardly of and bottomed by the inside face of a flange; said liner insert comprising a central member having side and end edges and dimensioned to be received within the central cap of said top, peripheral panels having upper and lower marginal portions, inner and outer surfaces, and longitudinal and transverse edges defining said lower marginal portions, one of said transverse edges having an arch wing-flap integral therewith, means securing the upper marginal portions of said peripheral panels to the edges of said central member whereby the panels are movable independently one from the other, said peripheral panels being resilient and adapted to be transversely flexed from an initial unfinished, incompletely shaped form to a tensioned, arcuate, bowed configuration from the longitudinal edges of said lower marginal portions to said secured upper marginal portions thereof incident to insertion of the said longitudinal edges and adjacent lower marginal portions of said panels into the throat of an elongate pocket whereby to dispose the said lower marginal portions of said panels in abutment with the upper inside face of a flange and to dispose the backing strip in substantial flatwise bearing relationship with the inner surface of said peripheral panels adjacent to the lower marginal portions thereof and with the free peripheral edges of said upstanding lips engaging the outer surface of said panels for providing a finished juncture between said edges and panels, and said panels outer surfaces embodying upholstery material extending across said longitudinal edges and turned back against and secured to the inner surfaces thereof.

4. In combination: a burial casket top and an interchangeable liner insert therefor; said burial casket top including a central cap having an integral depending peripheral rim provided with inwardly extending flanges which terminate in upstanding lips having free peripheral edges, each of said flanges having inner and outer faces which are adapted to be disposed in a horizontal position when the casket top is closed, a relatively wide, flat, backing strip secured to the inner face of each flange, each said backing strip including an upwardly inclined portion projecting in spaced relationship with and above and across and beyond the peripheral edge of the adjacent lip toward the central cap of the casket and defining with the adjacent lip edge the throat of an elongate pocket opening upwardly of and bottomed by the inner face of the adjacent flange; said liner insert comprising a central member having side and end edges and dimensioned to be received within the central cap of said casket top, peripherial panels having inner and outer surfaces and upper and lower marginal portions, means securing the upper marginal portions of said panels to the edges of said central member whereby the panels are movable independently of one another, said panels being resilient and adapted to be transversely flexed, those upwardly inclined portions of the backing strips which project across and beyond the peripheral edge of an adjacent lip constituting a guide member for and engageable by the lower marginal portion of each corresponding panel upon transverse bowing of said panel to clear the peripheral edge of the adjacent lip and for facilitating the introduction of the said lower marginal portion into the throat of an adjacent elongate pocket and extension to and against the bottom of the pocket, said guide member precluding accidental or unintentional movement of the lower marginal portions of the panels into the casket top incident to insertion into and withdrawal of the lower marginal portions of said panels from an elongate pocket, said backing strips each engaging the inner surface of the lower margin-adjacent portion of a peripheral panel throughout the entire length and width of said strip for backing and reinforcing said portion of a peripheral panel within and beyond the confines of the elongate pocket in which said marginal portion is received.

5. A liner insert according to claim 4, which includes a lifting tab having an end fixed to the lower marginal portion of a peripheral panel, and a free end accessible for graspign outside the limits of an elongate pocket of the casket top, for initiating displacement of the lower marginal portion for the peripheral panel from said pocket.

6. The method of inserting a readily insertable and removable upholstered liner insert comprising a central member having pairs of transversely flexible side and end peripheral panels each having inner and outer surfaces and free outer edges, into the interior of a casket top having an elevated central cap and a depending peripheral rim provided with interiorly extending side and end flanges which terminate in upwardly extending lips having free peripheral edges, and relatively wide, flat upwardly inclined backing strips projecting in spaced relationship with and above and across and beyond the free peripheral edges of said lips for defining with said free peripheral edges the throats of elongated pockets opening inwardly and upwardly of and bottomed by adjacent flanges; said method comprising the sequential steps of first positioning the central member of the insert within said central cap, then disposing the outer edge of one end peripheral panel over the free peripheral edge of a lip and into the pocket adjacent thereto, then transversely bowing first one and then the other of the side peripheral panels of the insert for placing the same under bowed tension and then disposing their free outer edges over the free peripheral edges of the lips of the side flanges and insliding contact with those portions of the adjacent backing strips which project beyond the peripheral edges of the adjacent lips and thence releasing the bowed and tensioned side panels while directing the free marginal edges into the throats of the elongate pockets on opposite sides of said casket top, to cause the said marginal edges to advance into and engage the bottoms of the pockets for maintaining said side panels under tension and in transverse bowed configuration and to resiliently urge portions of the central member in abutting relationship with said cap; then transversely bowing the remaining end peripheral panel of the insert and thusly placing the same under bowed tension with the free marginal edge of said remaining panel disposed over the free peripheral edge of a lip and in sliding contact with that portion of a backing strip which projects beyond the peripheral edge of the lip last mentioned, and then releasing the last-mentioned bowed and tensioned end panel while directing the free marginal edge thereof into the throat of the adjacent elongate pocket, to cause the said edge to advance into and engage the bottom of said pocket, for maintaining the peripheral end panels under transverse bowed tension and in tranverse bowed configuration to resiliently urge portions of the central member in abutting relationship with said cap, whereby said insert is removably maintained within said casket top solely by the stresses induced by bowing of said peripheral panels by reason of their respective marginal edges being seated with said elongate pockets.

7. A readily insertable and removable upholstered liner insert for the head-cap of a burial casket wherein the head-cap includes an elevated central portion having a depending peripheral rim portion turned inwardly and providing internally extending head, hinge, arch and top flanges having upper inside faces which are in horizontal positon when the head-cap is closed and wherein the head, hinge and top flanges terminate in upstanding lips having free peripheral edges, a relatively wide, flat backing strip secured to the inner face of each said head, hinge and top flanges, each said strip including an upwardly and inwardly inclined portion projecting in spaced relationship with and above and across and beyond the peripheral edge of an adjacent lip and defining with the adjacent lip the throat of an elongate pocket opening inwardly and upwardly of and bottomed by the inside face of an adjacent flange, said liner comprising: a central panel dimensioned to be received within the elevated central portion of said cap and having side and end edges, peripheral head, hinge, arch and top panels each having inner and outer surfaces and inner, outer and end edges, means securing the inner edges of said peripheral panels to the side and end edges of said central panel, the said head, hinge and top panels transversely bowed with their respective outer edges each received within an elongate pocket and bearing against the inside face of a corresponding flange for resiliently urging the central panel against and in place in the central portion of said cap, and the outer portion of said peripheral arch panel folded upwardly in a vertical plane normal to the arch flange of the head-cap with the outer surface of the upturned portion of said peripheral arch panel abutting the terminal edge of the arch flange of the head cap.

8. A liner insert for the top of a burial casket, said top having a central cap and an integral depending peripheral rim provided with inwardly extending flanges, each flange having an upper inside face which is in horizontal position when the top is closed, an upstanding lip on each flange, and a fixed cantilever leg on each flange, said leg overlying and in spaced relation with a substantial area of said flange inside face, and overhanging said lip in spaced relation therewith, comprising a central member having side and end edges and dimensioned to be received within the cap of said top, peripheral panels having upper and lower marginal portions and lower longitudinal and transverse edges, one of said transverse edges having an arch wing-flap integral therewith, means hingedly securing the upper marginal portions of said panels to the edges of said central member whereby the panels are movable on said hinge means independently one from the other, the panels being resilient and adapted to be transversely flexed to a transverse bow for facilitating positioning of the insert in the cap, the bodies of said panels being of regular and unchanging curvature from said secured upper marginal portions thereof to the said longitudinal edge of said lower marginal portions whereby the panels in the lower marginal portions are capable of being introduced into the spaces between the adjacent lips and the adjacent legs and to overlie and span a substantial area of said upper inside faces of the inwardly extending flanges, while bearing substantially flatwise upon the cantilever leg of the underlying flanges to resiliently maintain their transverse bowed form and resiliently hold the central member within and against said cap, and said panels including upholstery over the convex sides thereof and extending to and around the said lower longitudinal edges to be engaged by said lip and to form a substantially concealed line of joinder therewith.

9. In a top for a burial casket, said top having a central cap and an integral depending peripheral rim provided with inwardly extending flanges, each flange having an upper inside face which is in horizontal position when the top is closed, and upstanding lip on each flange, and a fixed cantilever leg on each flange, said leg overlying and in spaced relation with a substantial area of said flange inside face, and overhanging said lip in spaced relation therewith, a liner for said top comprising a central member having side and end edges and dimensioned to be received within the cap of said top, peripheral panels having upper and lower marginal portions and lower longitudinal edges, means hingedly securing the upper marginal portions of said panels to the edges of said central member whereby the panels are movable on said hinge means independently one from the other, the panels being resilient and adapted to be transversely flexed to a transverse bow for facilitating positioning of the insert in the cap, the bodies of said panels being of regular and unchanging curvature from said secured upper marginal portions thereof to the said longitudinal edge of said lower marginal portions whereby the panels in the lower marginal portions are capable of being introduced into the spaces between the adjacent lips and to overlie and span a substantial area of said upper inside faces of the inwardly extending flanges, while bearing substantially flatwise upon the cantilever leg of the underlying flanges to resiliently maintain their transverse bowed form and resiliently hold the central member within and against said cap, and said panels including upholstery over the convex sides thereof and extending to and around the said lower longitudinal edges to be engaged by said lip and to form a substantially concealed line of joinder therewith.

10. An interchangeable liner insert for unsecured demountability upon the top of a burial casket of the type which includes a central cap having an integral depending peripheral rim provided with inwardly extending flanges which terminate in upstanding lips each having a free peripheral edge, said flanges having inner and outer faces which are in a horizontal position when the top is closed, a relatively wide flat backing strip secured to the inner face of each of said flanges, each said backing strip including an inclined portion having a terminal end projecting in spaced relationship with and above and across and beyond the peripheral edge of the adjacent lip toward the central cap of the casket top and defining with the adjacent lip edge the throat of an elongate pocket opening upwardly of and bottomed by the inner face of the adjacent flange; said liner insert comprising a central member having side and end edges and dimensioned to be received within the central cap of said casket top, upholstered peripheral panels having upper and lower marginal portions and longitudinal and transverse edges bounding said marginal portions, one of said transverse edges having an arch wing-flap integral therewith, and, means securing the upper marginal portions of said panels to the edges of said central member whereby the panels are movable independently one from the other, said panels each being resilient and adapted to be transversely flexed as a prerequisite to insertion of the lower marginal portion thereof into the throat of an elongate pocket and thence in abutment along the longitudinal edge of such portion with the inner face of the flange and for locating the backing strip in substantial flatwise bearing relationship with those marginal portions of said peripheral panels adjacent the lower longitudinal edges thereof, for resiliently maintaining the central member of the insert within and against the central cap of the casket top, and the panel upholstery against the adjacent flange lip.

11. Structure as set forth in claim 7, wherein the adjacent end edges of adjoining peripheral panels are disposed in abutting relationship for providing neat appearing, finished, mitered edges at the juncture of said panels.

12. The method of inserting a removable unholstered liner insert comprising a central member having pairs of transversely flexible side and end peripheral panels carried by side and end edges of said central member and having inner and outer surfaces and free outer edges, into the interior of a casket top having an elevated central cap and a depending peripheral rim provided with interiorly extending side and end flanges which terminate in upwardly extending lips having free peripheral edges, and relatively wide, flat upwardly inclined backing strips projecting in spaced relationship with and above and across and beyond said free peripheral edges for defining with said free peripheral edges the throat of elongated pockets opening inwardly and upwardly of and bottomed by an adjacent flange; said method comprising the sequential steps of positioning the central member of the insert within said central cap, then transversely bowing first one and then the other one of the end peripheral panels of the insert for placing the same under bowed tension and then disposing their free outer edges thereof over the peripheral edges of the upstanding lips and against the undersides of their associated backing strips, then releasing the bowed and tensioned panels while directing the free marginal edges thereof into the throat against said undersides of the associated backing strips and into engagement with the bottom of the elongate pockets on opposite ends of said casket for maintaining said panels under tension and in transverse bowed configuration and to resiliently urge and maintain portions of the central member in abutting relationship with said cap; then transversely bowing the side peripheral panels of the insert to place the same under transverse, bowed tension and disposing their free outer edges over the peripheral edges of the adjacent upstanding lips and against the undersides of their associated backing strips, then releasing the bowed and tensioned panels while directing the free marginal edges thereof into the throat and into engagement with the bottoms of the elongate pockets on opposite sides of said casket for placing said panels under tension and in transverse bowed configuration and thereby resiliently maintain portions of the central member in abutting relationship with said cap; and positioning the ends of said last mentioned peripheral panels in abutment with the bowed end-adjacent portions of the end peripheral panels and thereby provide a neat mitered joint at the juncture of said panels, whereby said insert is removably maintained within said casket top solely by the stresses induced by bowing of said peripheral members incident to reception of the free outer edges of the peripheral panels of said liner into the said pockets of the casket top.

References Cited by the Examiner

UNITED STATES PATENTS 2,664,615    1/1954    Hillenbrand et al. _____ 27—19
3,077,016   12/1963    White _____ 27—19

RICHARD A. GAUDET, *Primary Examiner.*

W. E. KAMM, *Examiner.*